B. JOHNSTON.
MONOPLANE.
APPLICATION FILED AUG. 30, 1916.
1,304,883.
Patented May 27, 1919.
5 SHEETS—SHEET 1.
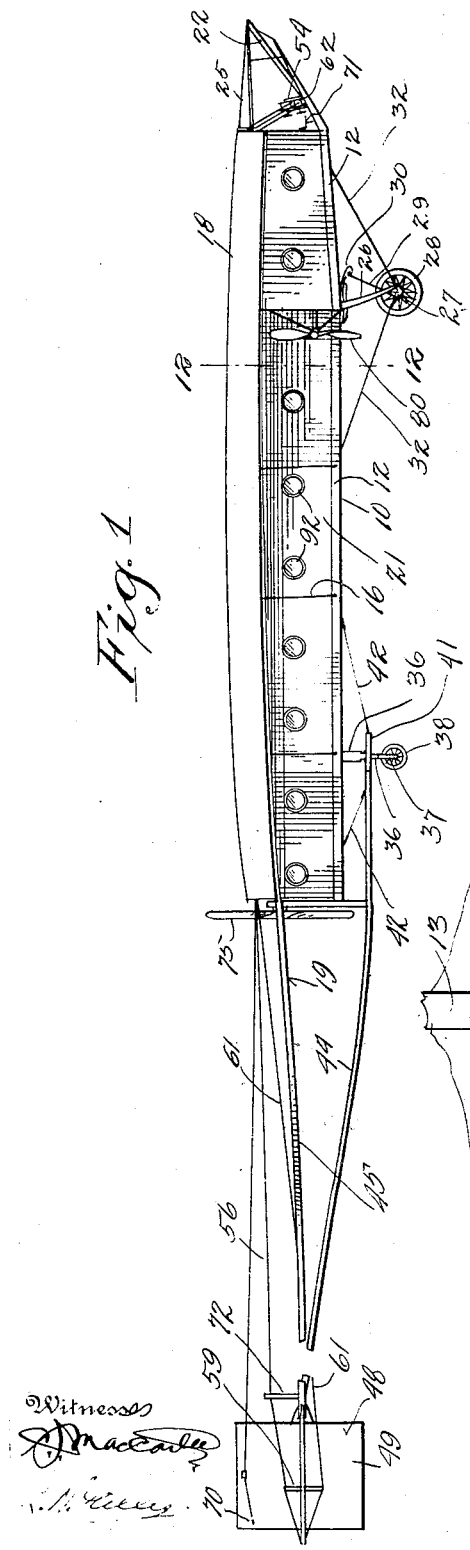
Inventor
B. Johnston
Witnesses
By
Attorney

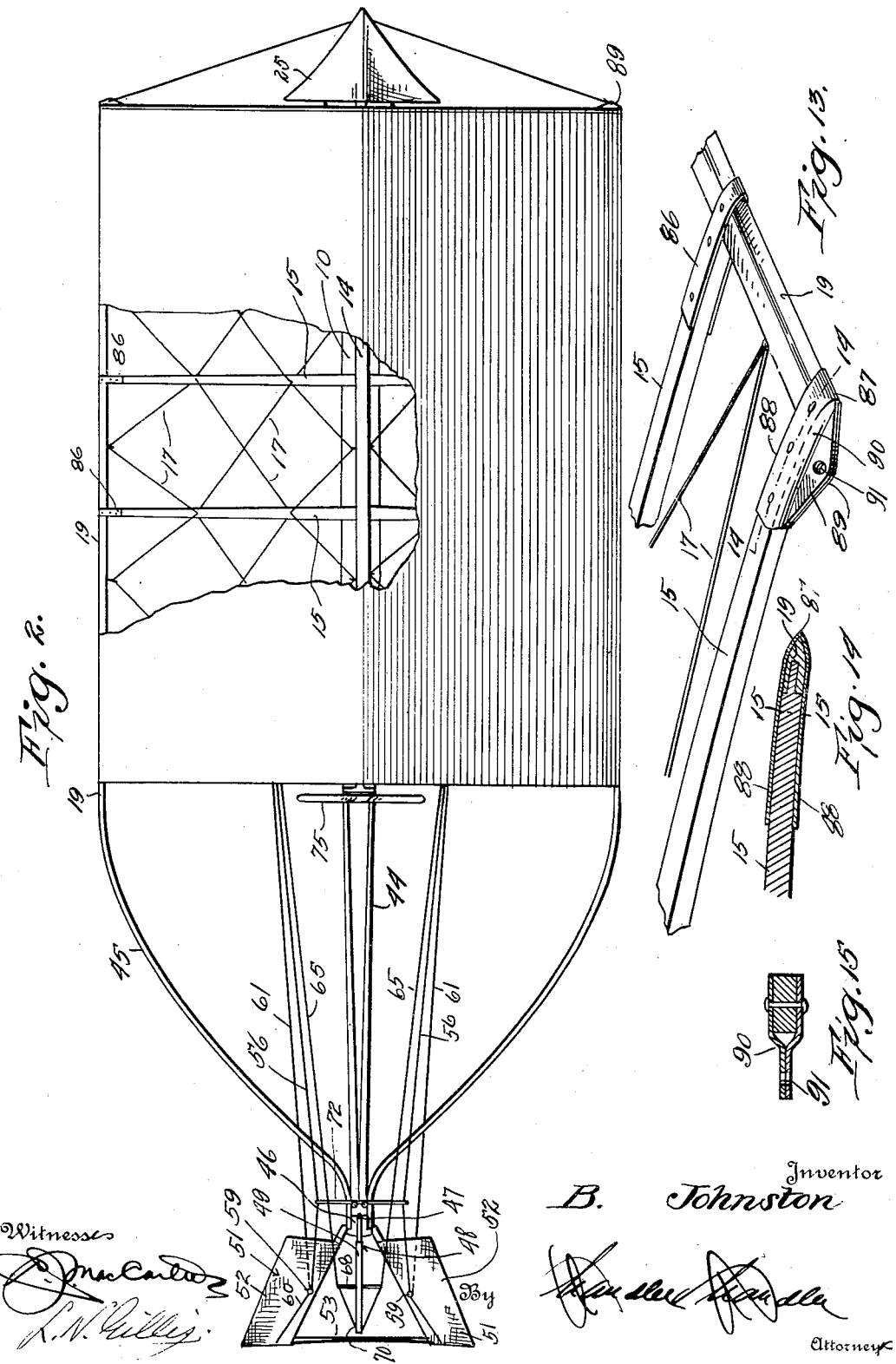
B. JOHNSTON.
MONOPLANE.
APPLICATION FILED AUG. 30, 1916.
1,304,883.
Patented May 27, 1919.
5 SHEETS—SHEET 2.

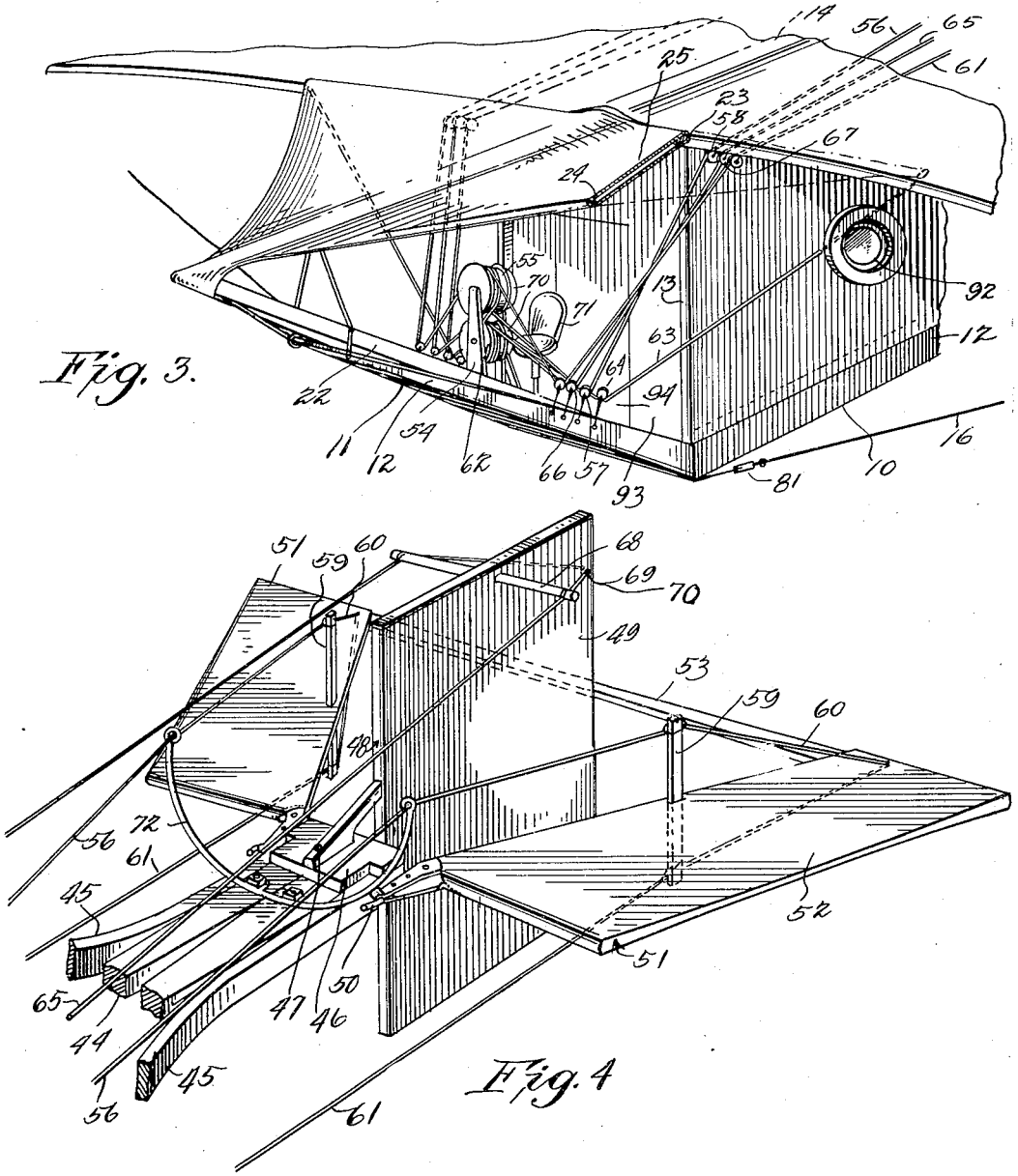

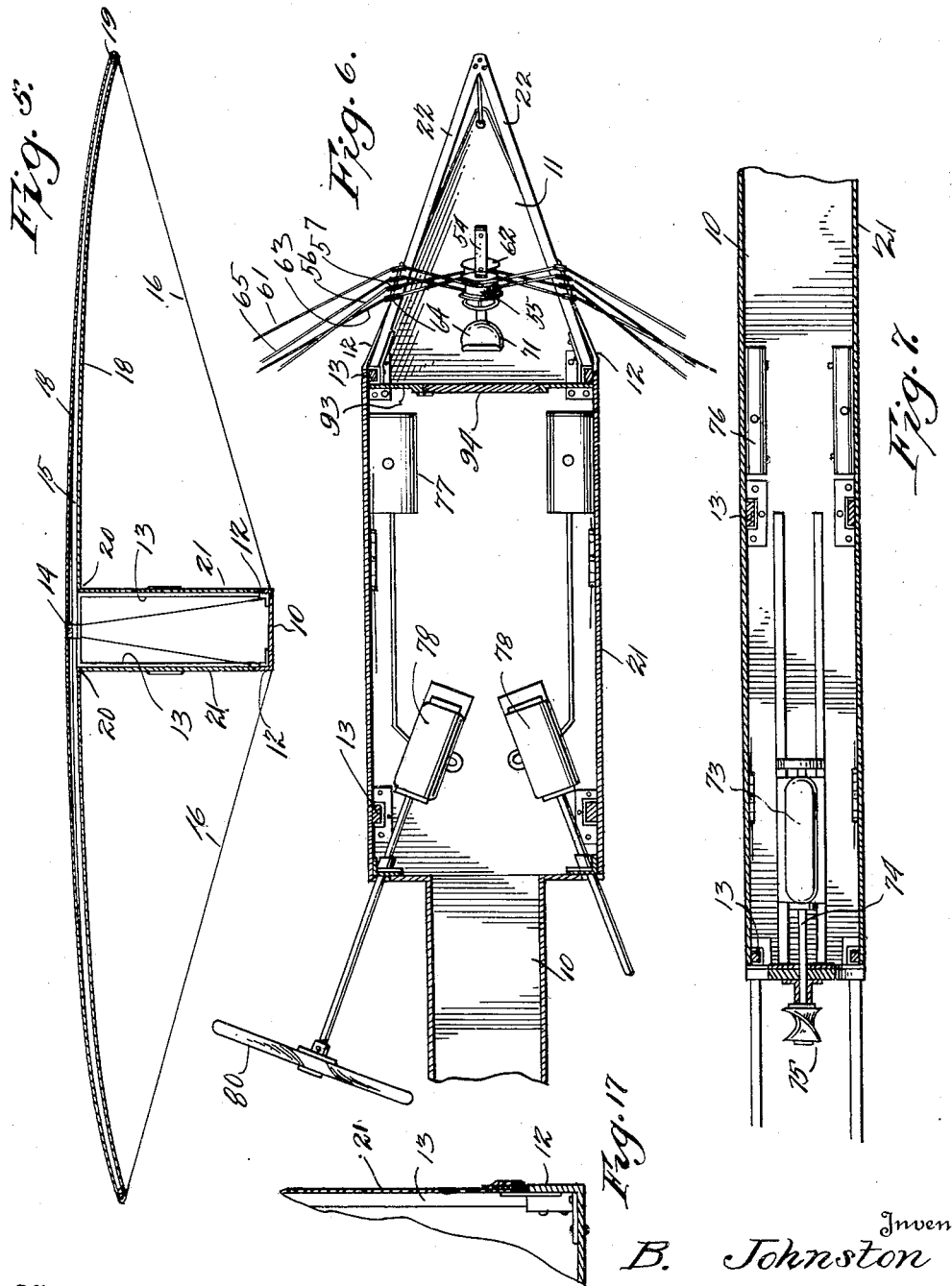

B. JOHNSTON.
MONOPLANE.
APPLICATION FILED AUG. 30, 1916.
1,304,883.
Patented May 27, 1919.
5 SHEETS—SHEET 5.
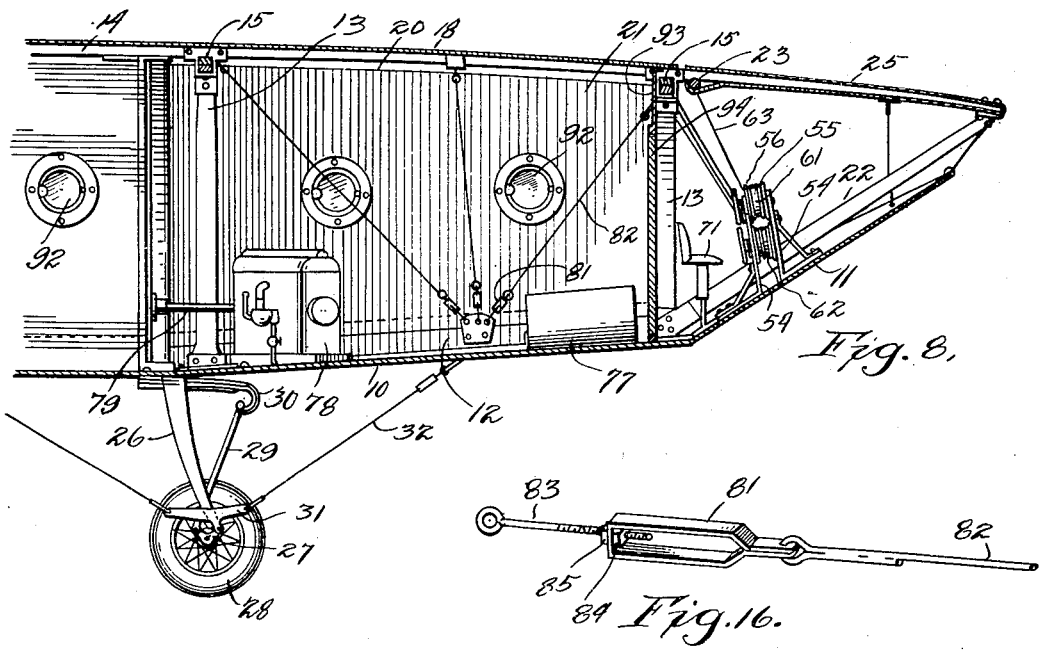
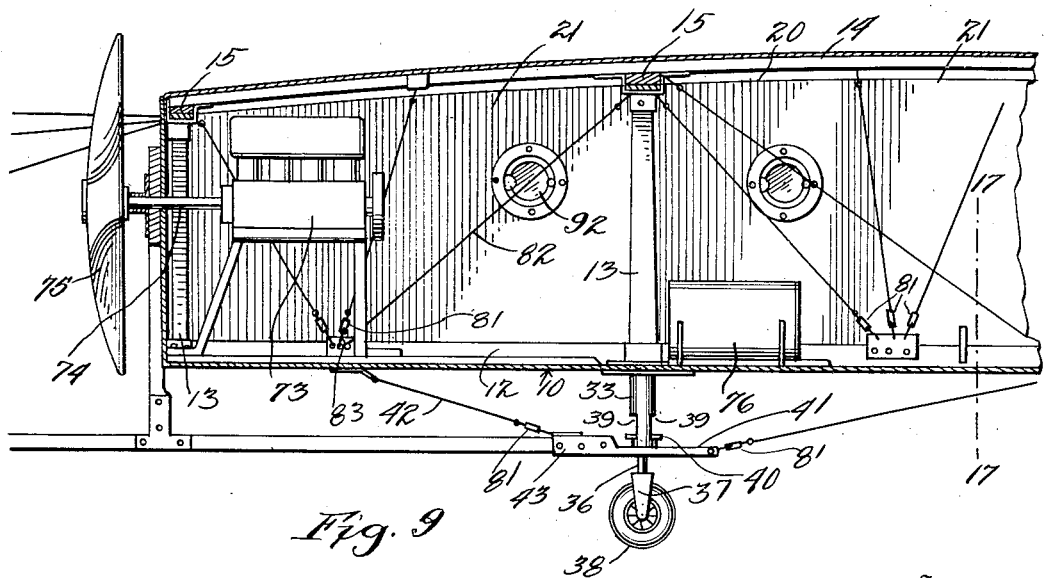
Inventor
B. Johnston
Witnesses
By
Attorney

UNITED STATES PATENT OFFICE.

BROOKS JOHNSTON, OF VALLEJO, CALIFORNIA.

MONOPLANE.

1,304,883.  Specification of Letters Patent.  Patented May 27, 1919.

Application filed August 30, 1916. Serial No. 117,701.

*To all whom it may concern:*

Be it known that I, BROOKS JOHNSTON, a citizen of the United States, residing at Vallejo, in the county of Solano, State of California, have invented certain new and useful Improvements in Monoplanes; and I do hereby declare the following to be a full, clear, and exact description of the invention, such as will enable others skilled in the art to which it appertains to make and use the same.

This invention relates to aerial navigation and has special reference to a heavier than air machine of the monoplane type.

One important object of the invention is to provide an improved and simplified construction of devices of this character.

A second important object of the invention is to provide an improved arrangement of main and banking planes for devices of this character.

A third important object of the invention is the provision of means for actuating the banking plane in the proper manner in unison with the actuation of the rudder for horizontal steering.

A fourth important object of the invention is the provision of an improved arrangement of main and stabilizing planes of devices of this character.

A fifth important object of the invention is the provision of improved arrangements of propeller drives for devices of this character.

A sixth important object of the invention is the provision of an improved arrangement and control for the elevating planes in devices of this character.

A seventh important object of the invention is the provision of an improved joint for the frames of aeroplanes and other like apparatus.

With the above and other objects in view, as will be hereinafter apparent the invention consists in general of certain novel details of construction and combinations of parts hereinafter fully described, illustrated in the accompanying drawings, and specifically claimed.

In the accompanying drawings, like characters of reference indicate like parts in the several views, and:—

Figure 1 is a side elevation, partly broken away, of a monoplane constructed in accordance with this invention.

Fig. 2 is a top plan view thereof, part of the main plane covering being broken away in order to show the framing.

Fig. 3 is a detail perspective of the front portion of the machine, certain of the parts being broken away.

Fig. 4 is a similar view of the rear or tail of the machine.

Fig. 5 is a transverse section through the main frame and nacelle.

Fig. 6 is a detail section taken horizontally below the main plane at the forward portion of the machine.

Fig. 7 is a similar detail section at the rear of the machine.

Fig. 8 is a detail vertical section through the front of the machine.

Fig. 9 is a detail vertical section through the rear of the machine.

Fig. 10 is a detail section showing the arrangement of the rear landing wheels.

Fig. 11 is a section on the line 11—11 of Fig. 10.

Fig. 12 is a detail fragmentary sectional view on the line 12—12 of Fig. 1.

Fig. 13 is a detail perspective view of two of the joints and a portion of the frame used herewith.

Fig. 14 is a longitudinal section on the line 14—14 of Fig. 13.

Fig. 15 is a section on the line 15—15 of Fig. 14.

Fig. 16 is a detail view of a guy tightening turn buckle used herewith.

Fig. 17 is a detail view showing the lower part of one of the stabilizing planes and its connection to the bottom of the nacelle.

In the embodiment of the invention herein illustrated the nacelle is provided with a floor or platform 10 which is inclined upwardly at the bow as at 11, this upwardly inclined portion being triangular so as to present its apex in the direction of flight. Moreover, the bottom and inclined portion 11 are provided with upturned lateral edges 12 and to these lateral edges are fixed the vertical struts 13 of the frame. These struts support a back bone or rib 14 which extends longitudinally of the machine and which, owing to the struts being of different heights, cambers upwardly in the center. Extending transversely of the struts, the latter being arranged in opposite pairs, are the main plane transverse members or ribs 15. These members 15 are connected to the bottom of the nacelle by brace wires 16 and are also connected to each other by suitable brace wires 17. Stretched over the members 15 is a covering 18 which is preferably of the usual aeroplane fabric, such as oiled silk, cotton or the like, and this covering 18 extends around the outer ends of the members 15, being supported on longitudinal members 19 and is then brought back beneath the members 15 to a point above the nacelle as indicated at 20. From this point each side edge of the covering extends downward as at 21 and is connected to the flanges or ribs 12 on that side. Thus the portions 21 constitute the stabilizing planes while at the same time an air cell is formed between the upper and lower parts of the covering 18 by reason of the spacing afforded by the transverse ribs or members 15.

The back bone 14 extends forwardly of the front transverse ribs and its forward end is held upright by means of a pair of frame braces 22 which extend from the seat of the forward strut 13 to the front end of the back bone 14. Swingingly mounted on the back bone just in front of the forward transverse rib is a banking plane rib 23. Extending from the ends of the rib 23 and connected to the front end of the back bone 14 are guy or stay wires 24 and carried by the rib 23 and the wire 24 is a covering 25 which forms the banking plane covering.

Extending downwardly beneath the forward end of the machine is a pair of struts 26 and to each of these struts is connected an arm 27 wherein is journaled a ground wheel 28. The remaining end of this arm is connected by means of a strut 29 with a spring 30 so that as the ground wheel strikes the ground the spring 30 will yield and relieve the shock on the machine. The struts 26 are provided with forward and aft extensions 31 which are connected by means of guy wires 32 to the bottom of the nacelle.

Beneath the rear end of the machine there is provided a pair of oppositely disposed tubes 33 wherein are mounted plungers 34 which are normally pressed downward by means of springs 35. These plungers carry stems 36 having on their lower ends forks 37 and in each of these forks is mounted a ground wheel 38. These stems extend through the lower portions of the tubes 33 which are provided with front and rear vertical slots 39 and in order to limit the angular movement of the stems a cross member 40 extends through each one of the stems, its ends projecting through the slots. It is to be noted that the slots are of sufficient width to permit movement of the member 40 through an angle of about 90° so that the ground wheels 38 may be readily turned as the machine is moved in one direction or the other over the ground.

The lower ends of the tubes 33 are provided with brace bars 41 which are connected to the bottom of the nacelle by means of braces 42. At the rear end of each of these brace bars 41 is provided a socket 43 wherein is fitted the forward ends of a tail brace member 44. The side members 19 are curved inwardly as at 45 so that they are brought together rearwardly of the main planes and are there provided with means for connecting them to each other and to the members 44 as indicated at 46. At the rear of the connection of the members 44 and 45 there is provided a vertical pivot 47 whereon is mounted a rudder frame 48 having stretched thereover a suitable fabric covering as at 49 to form the horizontal steering rudder. Pivoted to each side of the tail connections on the horizontal pivot 50 are elevator plane frames 51 which are each covered by suitable fabric as at 52 to constitute the planes for elevating or depressing the forward end of the monoplane. These planes 52 are connected at their rear ends by a cross bar 53.

Mounted at the forward end of the machine are supports 54 and journaled in these supports is a drum 55 around which are wound the wires 56 which lead upwardly through idler pulleys 57 and then rearwardly through idler pulleys 58 to the upper ends of struts 59 fixed to the respective elevating planes 52, the wires being carried downward as at 60 to the rear edges of said elevating planes. Similar wires 61 are similarly led through idler pulleys 57 and 58 and connect to the lower ends of the struts 59 and thence to the rear edges of the planes 52.

Also mounted in the supports 54 is a drum 62 and around this drum are wound wires 63 which lead to idler pulleys 64 and thence upwardly to the outer ends of the member 23 so that as the drum 62 is rotated in one direction or the other the respective end of the member 23 will be pulled downward. Other wires 65 are also wound around the drum 62 and lead through idler pulleys 66 and 67 to the respective ends of a strut 68 which extends laterally through the rudder plane 49, the extreme rear ends of the wires being connected to the rear edge of the rudder as at 70. Each of the drums 54 and 62 is provided with a suitable operating wheel 70. Also there is provided the usual operator's seat 71 adjacent these drums. In order to provide for proper lifting of the elevating planes the tail connection has mounted thereon a bracket 72 through which extend the wires 56 as clearly shown in Fig. 4.

Mounted at the rear of the nacelle is an engine 73 provided with a shaft 74 on which is the main propeller 75, the shaft being in axial parallelism with the axis of the machine. This engine is provided with its gasolene from the usual tank 76 and at 77 on the forward end of the machine is a similar gasolene tank which provides the gasolene for engines 78 which have rearwardly divergent shafts 79 each carrying a propeller 80 the arrangement being best seen in Fig. 6. By means of these divergent shafts with their propellers the front end of the machine is at all times steadied.

Wherever necessary the guy wires are provided with a tightening arrangement which consists of a frame 81 to one end of which is connected a guy wire, as the guy wires 82 which brace the struts and nacelle together. Through the other end of this frame extends the shank of an eye bolt 83 which carries within the frame a nut 84 and without the frame a similar nut 85, so that the wires 82 may be tightened as desired. The different frame members are either connected by means of straps 86 as shown in Fig. 13 or, in the instance of corner members, by the special connection also shown in that figure. This connection consists of a single plate of metal which is bent intermediate its ends as at 87 to form a strap 88 which embraces the connecting portions of the two frame members. Moreover, this sheet of metal has laterally extending triangular wings 89 which are crimped together as at 90 and provided with registering openings 91 for the attachment of the guy wires. By this means a strong and effective joint is formed. To afford light to the interior of the passenger space in the machine suitable glazed ports 92 are provided in the side walls or stabilizing planes 21 and at the forward end of the machine the pilot station is cut off from the remainder of the passenger space by a screen 93 provided with a suitable door 94.

From the arrangement and connection of the vertical rudder and the banking plane it will be seen that every time the vertical rudder is moved to the left to cause the machine to go to the left the right hand corner of the banking plane is tilted upward. Thus the banking plane acts to prevent bodily drift to the left and assists the rudder in turning.

There has been thus provided a simple and efficient device of the kind described and for the purpose specified.

It is obvious that many minor changes may be made in the form and construction of the invention without departing from the material principles thereof. It is not therefore desired to confine the invention to the exact form herein shown and described but it is wished to include all such as properly come within the scope claimed.

For instance the pilot house may be inclosed, if desired, to afford protection from the weather and wind.

Having thus described the invention, what is claimed as new, is:—

1. In a flying machine, a main plane frame, said main plane being longer than wide and having the frame portion thereof provided with side members curved inwardly at their rear ends to form a support for elevating and steering rudders, and a cover therefor comprising a sheet of material extending over the top of the frame and around the lateral edges of said frame and thence inwardly on the underside of said frame, said sheet having its lateral edge portions extending downwardly in spaced relation to form stabilizing planes, the space between said stabilizing planes communicating with the space between the upper and lower parts of the cover.

2. In a flying machine, a main plane, and a pair of stabilizing planes extending entirely from front to rear of the main plane and spaced equally from the longitudinal axis of said main plane, said stabilizing planes extending downward to form sides for the body of the flying machine and the front portion of the bottom of the body of the machine extending upwardly at an obtuse angle, as and for the purposes set forth.

3. In a heavier than air machine of the monoplane type, a main supporting plane bowed slightly downwardly at the sides thereof, a body centrally beneath the main plane and extending longitudinally of the same, the sides of the frame of the main plane converging rearwardly and joined at their rear ends, a tail brace extending from the bottom of the body to the rear of said sides, front and rear chassis for the body, the rear chassis having connection with the tail brace, a vertical rudder pivoted to the rear of the frame where joined, elevators at either side of the rudder and connected at their rear ends, means for swinging the rudder and the elevators, propelling means for the machine, said body having an upwardly inclined front portion, a banking plane at the front edge of the main plane pivoted on a horizontal axis and means for actuating the banking plane.

In testimony whereof, I affix my signature, in the presence of two witnesses.

BROOKS JOHNSTON.

Witnesses:
J. W. KEMPSTER,
A. DICKINSON.